US011935307B2

United States Patent
Ozaki et al.

(10) Patent No.: US 11,935,307 B2
(45) Date of Patent: Mar. 19, 2024

(54) VEHICLE CONTROL APPARATUS

(71) Applicant: HITACHI AUTOMOTIVE SYSTEMS, LTD., Hitachinaka (JP)

(72) Inventors: Koichiro Ozaki, Hitachinaka (JP); Takashi Tsutsui, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 824 days.

(21) Appl. No.: 16/977,266

(22) PCT Filed: Dec. 14, 2018

(86) PCT No.: PCT/JP2018/046039
§ 371 (c)(1),
(2) Date: Sep. 1, 2020

(87) PCT Pub. No.: WO2019/176200
PCT Pub. Date: Sep. 19, 2019

(65) Prior Publication Data
US 2021/0049380 A1    Feb. 18, 2021

(30) Foreign Application Priority Data
Mar. 12, 2018    (JP) .................. 2018-044137

(51) Int. Cl.
*G06V 20/58*    (2022.01)
*B60W 50/14*    (2020.01)
(Continued)

(52) U.S. Cl.
CPC ............. *G06V 20/58* (2022.01); *B60W 50/14* (2013.01); *B62D 15/028* (2013.01);
(Continued)

(58) Field of Classification Search
CPC ..... G06V 20/58; G06V 20/625; B60W 50/14; B60W 2420/42; B60W 2420/52;
(Continued)

(56) References Cited

U.S. PATENT DOCUMENTS 11,034,362 B2* 6/2021 Rao .................... B60W 50/085
2003/0076414 A1 4/2003 Sato et al.
(Continued)

FOREIGN PATENT DOCUMENTS

DE    102008054641 A1    6/2010
DE    102015212581 A1    1/2017
(Continued)

OTHER PUBLICATIONS

German Office Action dated Jan. 26, 2023 for German Patent Application No. 112018006294.5.
(Continued)

*Primary Examiner* — Santiago Garcia
(74) *Attorney, Agent, or Firm* — Volpe Koenig

(57) ABSTRACT

A vehicle control automatically distinguishes between a moving body and a stationary body, reduces user's operation process, and reduces burdens to shorten time for a parking process. Obstruction points are grouped so as to be divided between obstructions, coloring of moving and stationary bodies are changed for each obstruction, and it is determined whether there is an obstruction for which the coloring has not been changed. If there is an obstruction for which the coloring has not been changed, whether there is license plate information and whether the obstruction is a moving body or a stationary body are determined, and a moving body is changed to red and a stationary body to blue. A display device displays the obstruction information distinguished between stationary or moving objects, and a message to the
(Continued)

user such as "obstruction stored" notifies the user of completion of the distinction of the obstruction types.

7 Claims, 7 Drawing Sheets

(51) Int. Cl.
 B62D 15/02 (2006.01)
 G06V 20/62 (2022.01)
(52) U.S. Cl.
 CPC ..... *B60W 2420/42* (2013.01); *B60W 2420/52* (2013.01); *B60W 2554/00* (2020.02); *G06V 20/625* (2022.01)
(58) Field of Classification Search
 CPC ....... B60W 2554/00; B60W 2050/146; B60W 2420/54; B60W 2554/404; B62D 15/028; G08G 1/168; B60R 2300/305; B60R 2300/607; B60R 2300/806; B60R 1/00
 See application file for complete search history.

(56) References Cited

U.S. PATENT DOCUMENTS

| | | | | |
|---|---|---|---|---|
| 2014/0232538 A1* | 8/2014 | Sobue | ................. | B60R 1/00 340/435 |
| 2014/0310739 A1* | 10/2014 | Ricci | ................. | G06Q 20/321 725/75 |
| 2015/0077560 A1* | 3/2015 | Zhang | ................. | G06T 3/4038 348/148 |
| 2017/0076608 A1 | 3/2017 | Suzuki et al. | | |
| 2017/0088130 A1* | 3/2017 | Suzuki | ................. | G08G 1/168 |
| 2017/0158134 A1 | 6/2017 | Shigemura | | |
| 2017/0313247 A1* | 11/2017 | Hsu | ................. | G01S 17/89 |
| 2018/0129218 A1* | 5/2018 | Kato | ................. | G05D 1/0088 |
| 2018/0198955 A1* | 7/2018 | Watanabe | ................. | G08G 1/16 |
| 2018/0208245 A1* | 7/2018 | Mizutani | ................. | B60W 30/06 |

FOREIGN PATENT DOCUMENTS

| | | |
|---|---|---|
| DE | 112015002772 T5 | 3/2017 |
| DE | 102017006078 A1 | 2/2018 |
| JP | 2003-189293 A | 7/2003 |
| JP | 2007-304712 A | 11/2007 |
| JP | 2008-213741 A | 9/2008 |
| JP | 2009-122786 A | 6/2009 |
| JP | 2011-175508 A | 9/2011 |
| JP | 2011-198114 A | 10/2011 |
| JP | 2015-232845 A | 12/2015 |
| JP | 2016-013793 A | 1/2016 |

OTHER PUBLICATIONS

International Search Report, PCT/JP2018/046039, dated Sep. 3, 2019, 2 pgs.

* cited by examiner

VEHICLE CONTROL APPARATUS

TECHNICAL FIELD

The present invention relates to a vehicle control apparatus that assists driving.

BACKGROUND ART

There is known a vehicle control apparatus that detects obstructions by an obstruction detection device while moving a vehicle from an arbitrary point around a target parking position to the target parking position and parks the vehicle.

In the vehicle control apparatus, information on positions of the obstructions detected by the obstruction detection device is stored in a memory.

The stored obstruction information can be distinguished by types to be stored through user's input operation of selecting the types of the obstructions detected by the obstruction detection device.

When the vehicle is parked at the same parking position and is taken out of the same parking position next time or later, the positions of and the information on the obstructions existing around the parking position can be grasped in advance.

Use of the stored obstruction information thus enables driving assistance such as parking assistance when the vehicle is moved from an arbitrary point to the parking position and exiting assistance when the vehicle is moved from the parking position to an arbitrary point. Various parking modes, not limited to garage parking, parallel parking, and the like, can be coped with.

PTL 1 describes a technique in which, when obstruction information is stored in generation of an obstruction information map of a parking environment, a user distinguishes between movable obstructions (moving bodies) such as an automobile and a motorcycle and irremovable obstructions (stationary bodies) such as a wall and a structure for each obstruction, and manually selects each obstruction type to generate the obstruction information map.

CITATION LIST

Patent Literature

PTL 1: JP 2008-213741 A

SUMMARY OF INVENTION

Technical Problem

However, in the technique described in PTL 1, a user has to manually select each obstruction type, which has not only burdened the user but also taken time for the automatic parking process.

The present invention has been made in view of the above problems, and an object of the present invention is to realize a vehicle control apparatus that can automatically distinguish between a moving body and a stationary body that are defined as obstruction types, reduce user's operation process, and reduce burdens to shorten time for a parking process.

Solution to Problem

In order to achieve the above object, the present invention is configured as follows.

A vehicle control apparatus includes an obstruction detector configured to detect an obstruction existing around a target parking position of a vehicle, and a parking assistance unit configured to store information on the obstruction detected by the obstruction detector, determine a type of the obstruction from the stored information on the obstruction, perform an obstruction storage process including setting an identification indication for identifying the determined type of the obstruction and storing the set identification indication with the information on the obstruction, and display the stored information on the obstruction and the stored identification indication for the obstruction on a display device.

Advantageous Effects of Invention

According to the present invention, it is possible to realize a vehicle control apparatus that can automatically distinguish between a moving body and a stationary body that are defined as obstruction types, reduce user's operation process, and reduce burdens to shorten time for a parking process.

Problems, configurations, and advantageous effects other than those described above will be clarified by the following description of the embodiment.

DESCRIPTION OF EMBODIMENTS

Hereinafter, an embodiment of a vehicle control apparatus of the present invention will be described with reference to the drawings.

Embodiment

Figure 1:
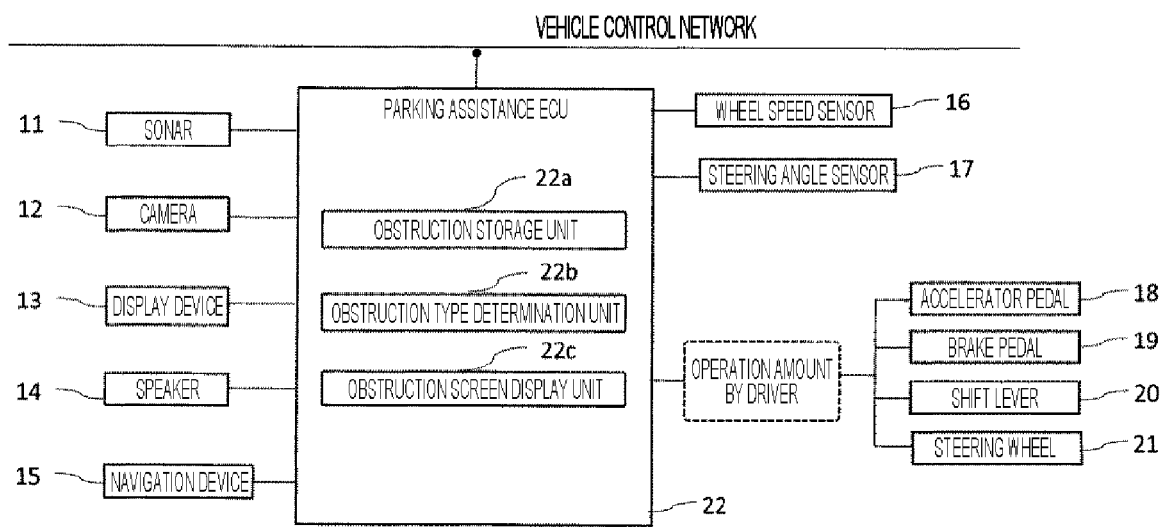
FIG. 1 is a diagram showing an overall configuration of a parking assistance system as a vehicle control apparatus to which the present invention is applied.

FIG. 1 is a diagram showing an overall configuration of a parking assistance system as a vehicle control apparatus to which the present invention is applied.

In FIG. 1, the parking assistance system as the vehicle control apparatus is mounted in a vehicle, and includes sonars 11 (11A to 11L) as obstruction detection devices (obstruction detectors), cameras 12 (12a to 12d) as obstruction detection devices (obstruction detectors), a display device 13, a speaker 14, and a navigation device 15.

Further, the parking assistance system includes a wheel speed sensor 16, a steering angle sensor 17, an accelerator pedal 18, a brake pedal 19, a shift lever 20, a steering wheel 21, and a parking assistance ECU (parking assistance unit) 22 to which these are connected and to which their operation amounts by a driver are input.

The parking assistance ECU 22 includes an obstruction storage unit 22a, an obstruction type determination unit 22b, and an obstruction screen display unit 22c, and is connected to a vehicle control network.

The sonar 11 is used to detect a distance to an obstruction by transmitting an ultrasonic wave toward an environment of the own vehicle and receiving a reflected wave of the ultrasonic wave.

The camera 12 is used to image information on an obstruction by an image sensor attached around the own vehicle.

Figure 2:
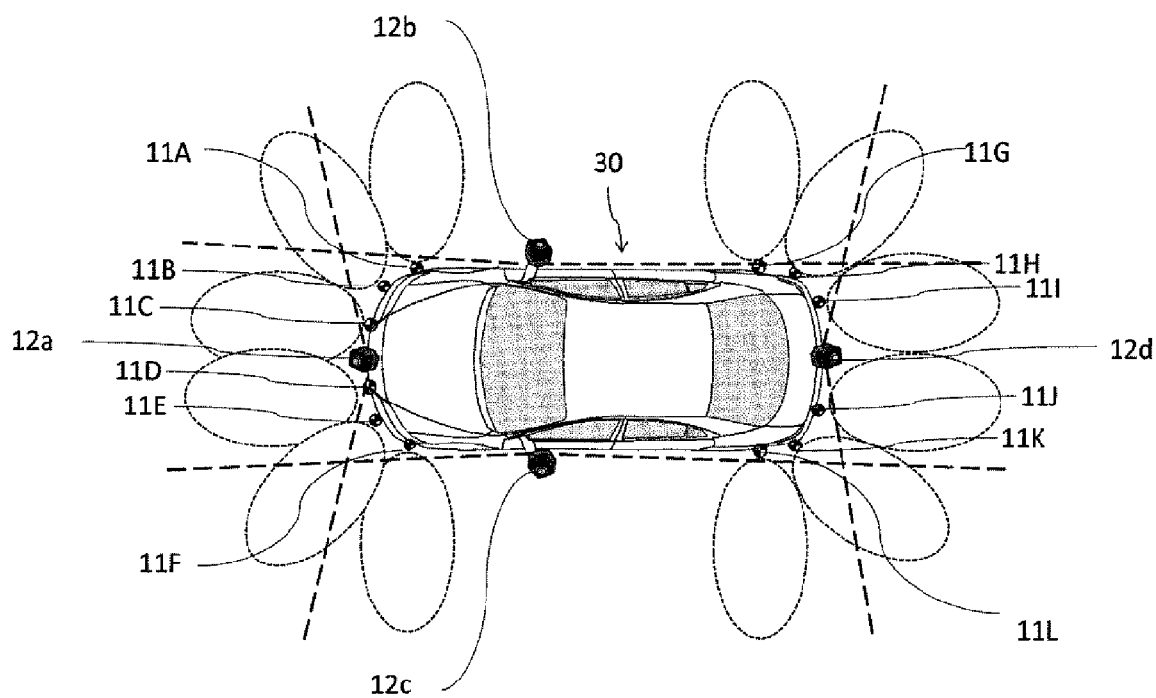
FIG. 2 is a view showing positions and detection ranges of sonars and cameras mounted on front, side, and rear parts of a vehicle.

FIG. 2 is a view showing positions and detection ranges of the sonars 11A to 11L and the cameras 12a to 12d mounted on front, side, and rear parts of the own vehicle 30.

As shown in FIG. 2, a total of six sonars 11A, 11B, 11C, 11D, 11E, and 11F are arranged at the front of the own vehicle 30, and a total of six sonars 11G, 11H, 11I, 11J, 11K, and 11L are arranged at the rear of the own vehicle 30.

The ellipses shown by the dotted lines in FIG. 2 indicate the detection ranges of the respective ultrasonic sensors 11A to 11L.

The cameras 12a, 12b, 12c, and 12d, which are in-vehicle cameras using image sensors, are used to detect an obstruction existing around the parking position of the own vehicle 30 and are used to recognize a license plate of an obstruction around the own vehicle 30 and detect the obstruction around the vehicle.

As shown in FIG. 2, the camera 12a is attached to the front of the own vehicle 30, the cameras 12b and 12c are attached to the right and the left of the own vehicle 30, and the camera 12d is attached to the rear of the own vehicle 30. The straight dotted lines shown in FIG. 2 indicate the detection ranges of the respective cameras 12a to 12d. Pictures captured by the four cameras 12a to 12d are converted and combined, which enables generation of a bird's-eye view of the own vehicle 30 and surroundings of the own vehicle 30 from above.

The bird's-eye view is used to be displayed on the display device 13.

The display device 13 is constituted by, for example, a liquid crystal display, and a display screen of the display device 13 displays a bird's-eye view image captured by the cameras 12a to 12d and displays an image of an image signal from the parking assistance ECU 22.

A touch panel is employed for the display screen of the display device 13 and is used for various input operations.

The speaker 14 is arranged at an appropriate place in the vehicle interior of the own vehicle 30, and is utilized for outputting voice guidance and a warning sound to a user.

The navigation device 15 is a navigation device including a map display function of displaying a current position of the own vehicle 30 and a road map around the current position, a route guidance function of performing route guidance to a destination, and the like.

The navigation device 15 includes a position detector (not shown) that detects the current position of the own vehicle 30.

The position detector includes an azimuth sensor that measures an azimuth in front of the own vehicle 30, and a GPS receiver for a GPS (Global Positioning System) that measures the position of the vehicle based on radio waves from satellites.

Based on these measurement results, vehicle speed pulse signals output from the wheel speed sensor 16, steering angle signals output from the steering angle sensor 17, and the like, the self-position and the azimuth of the own vehicle 30 are measured.

The wheel speed sensor 16 generates pulse signals corresponding to rotation of wheels of the own vehicle 30, and the number of the generated wheel speed pulses is integrated for calculation of a moving distance of the own vehicle 30.

The steering angle sensor 17 is a sensor that detects a steering angle of the steering wheel of the own vehicle 30, and an angle for steering is calculated from the value detected by the steering angle sensor 17.

The accelerator pedal 18 is used when a user gives a driving force to a driving motor (not shown).

The brake pedal 19 is used when the user gives a braking force to a wheel cylinder (not shown).

The shift lever 20 is used when the user gives an instruction to move forward or backward as a traveling direction of the own vehicle 30.

The steering wheel 21 is used when the user gives an instruction on the traveling direction of the own vehicle 30 through operation of right and left front wheels (wheels for steering).

The parking assistance ECU 22 includes, as described above, the obstruction storage unit 22a, the obstruction type determination unit 22b, and the obstruction screen display unit 22c, which are mainly configured as a microcomputer equipped with a Central Processing Unit (CPU), a Read Only Memory (ROM) that is a non-volatile memory, a Random Access Memory (RAM) that is a volatile memory, a bus, and the like. The CPU executes storage arithmetic processing according to a processing program written in the ROM.

Next, operation of the parking assistance ECU 22 will be described.

In the parking assistance ECU 22, first, when a driver of the own vehicle park the own vehicle at a target parking space of the own vehicle (hereinafter, a parking position) by driving operation, information on obstructions detected by the sonars 11A to 11L and the cameras 12a to 12d during movement of the own vehicle is stored (an obstruction storage process).

This obstruction information is stored in the obstruction storage unit 22a that is the non-volatile memory of the parking assistance ECU 22.

Hereinafter, the obstruction storage process and an obstruction selection process in the parking assistance ECU (driving assistance system) 22 will be described with reference to FIGS. 3 to 8.

Figure 3:
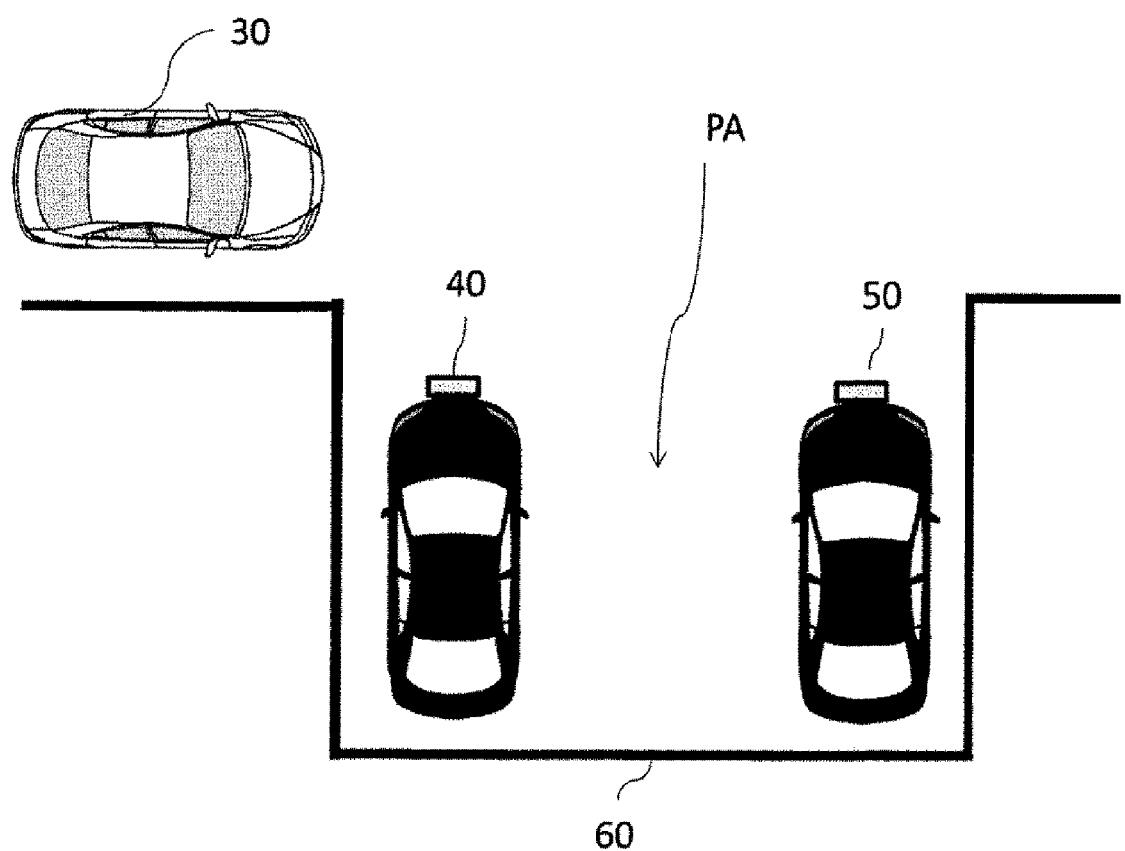
FIG. 3 is a view illustrating a motion of parking the vehicle at a parking position.
Figure 4:
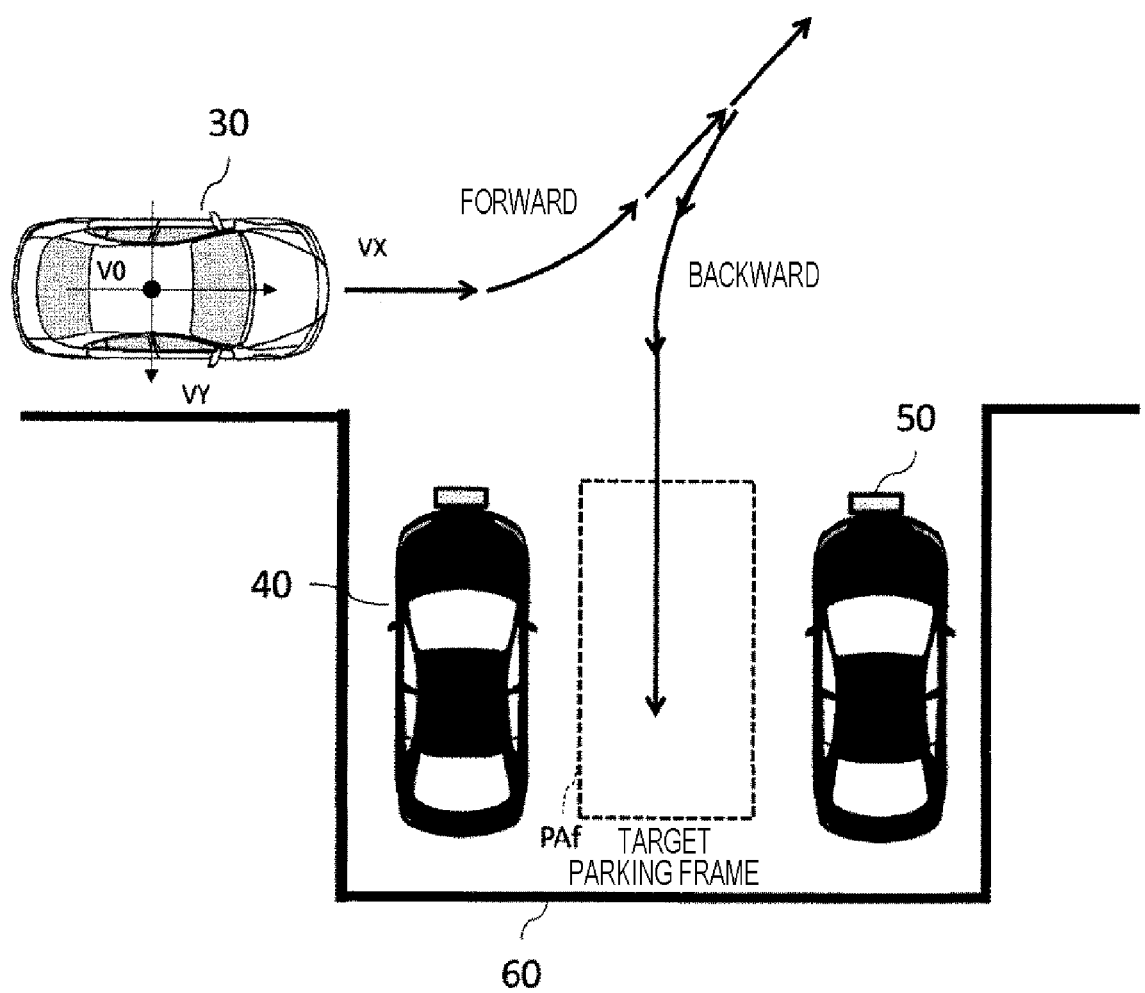
FIG. 4 is a view illustrating the motion of parking the vehicle at the parking position.
Figure 5:
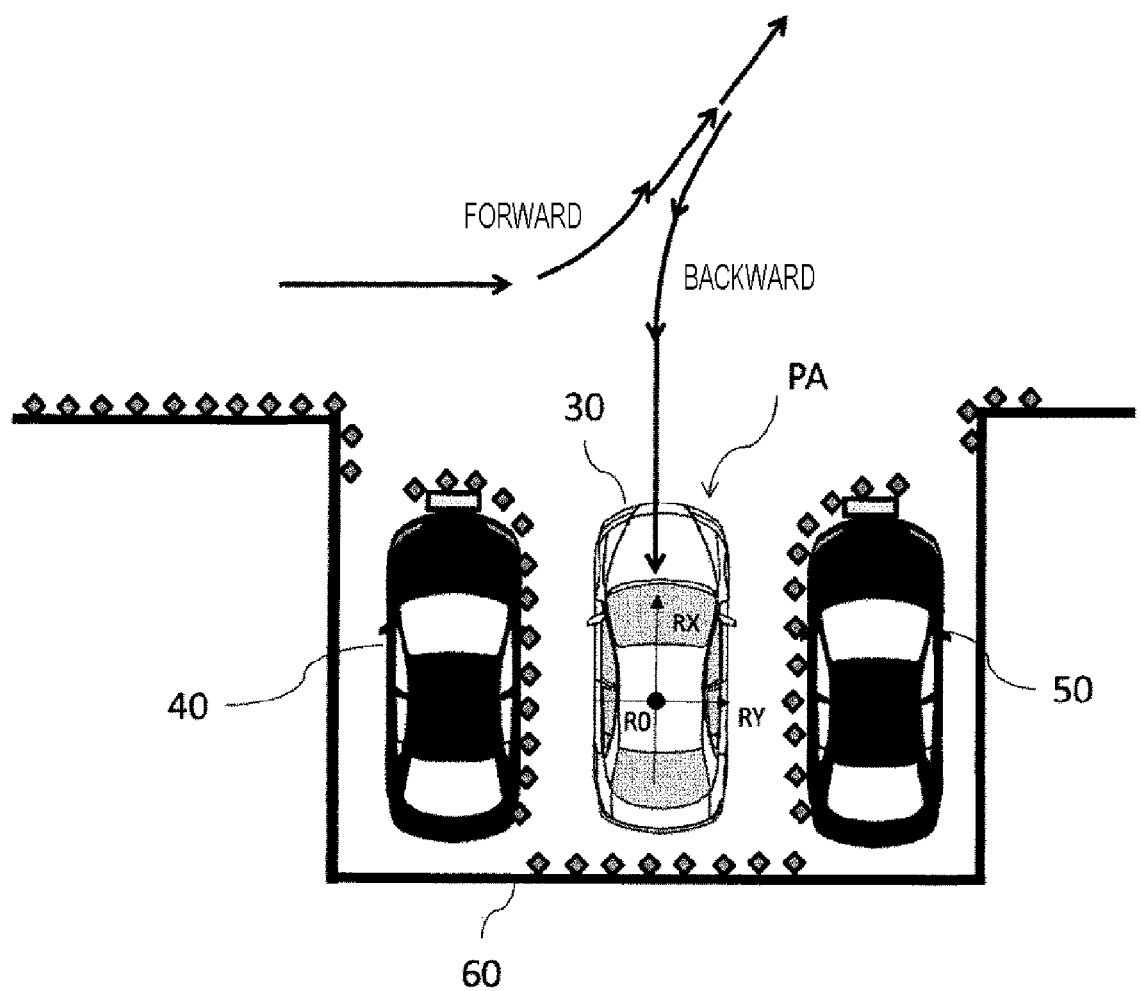
FIG. 5 is a view illustrating the motion of parking the vehicle at the parking position.
Figure 6:
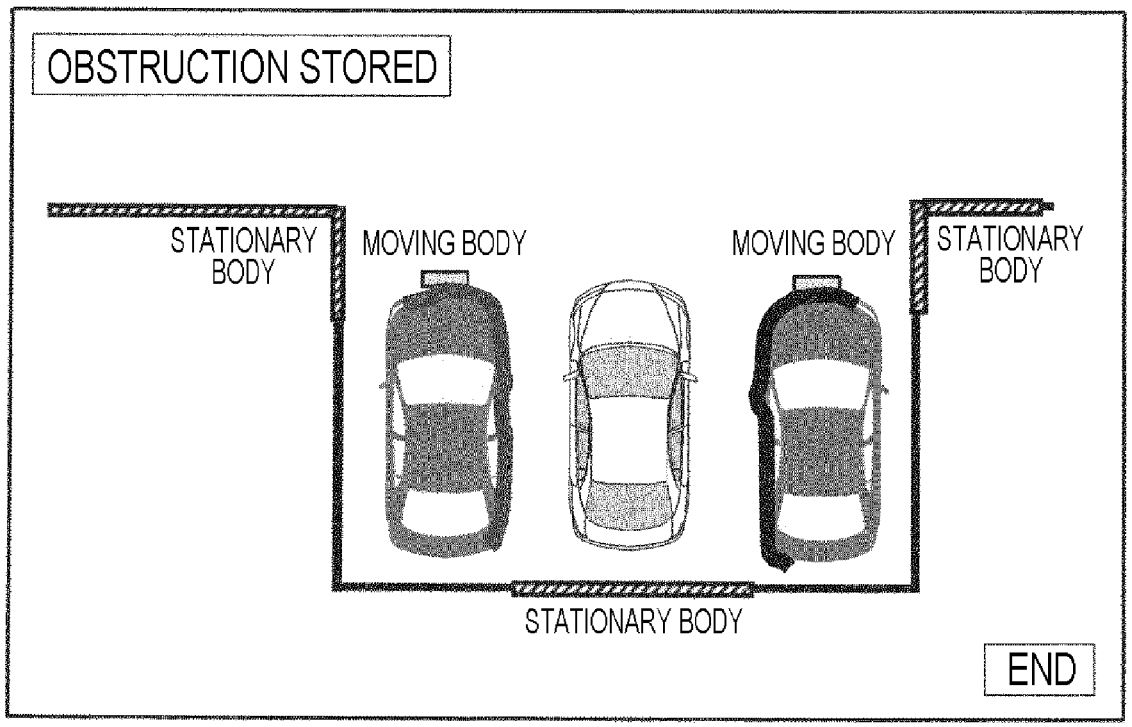
FIG. 6 is a view showing an example of a screen display indicating completion of generation of an obstruction information map by automatically distinguishing obstruction types and changing coloring of a moving body and a stationary body in an obstruction selection process.

FIGS. 3, 4, and 5 are views illustrating a motion of parking the own vehicle 30 at the parking position PA. FIG. 6 is a view showing an example of a screen display indicating completion of generation of an obstruction information map by automatically distinguishing obstruction types and changing coloring of a moving body and a stationary body in the obstruction selection process.

In this embodiment, as shown in FIG. 3, an example will be described in which the own vehicle 30 moves forward to enter a parking lot where there are adjacent vehicles 40 and 50 and a wall 60 at a rear and moves backward to park at the target parking position PA.

Figure 7:
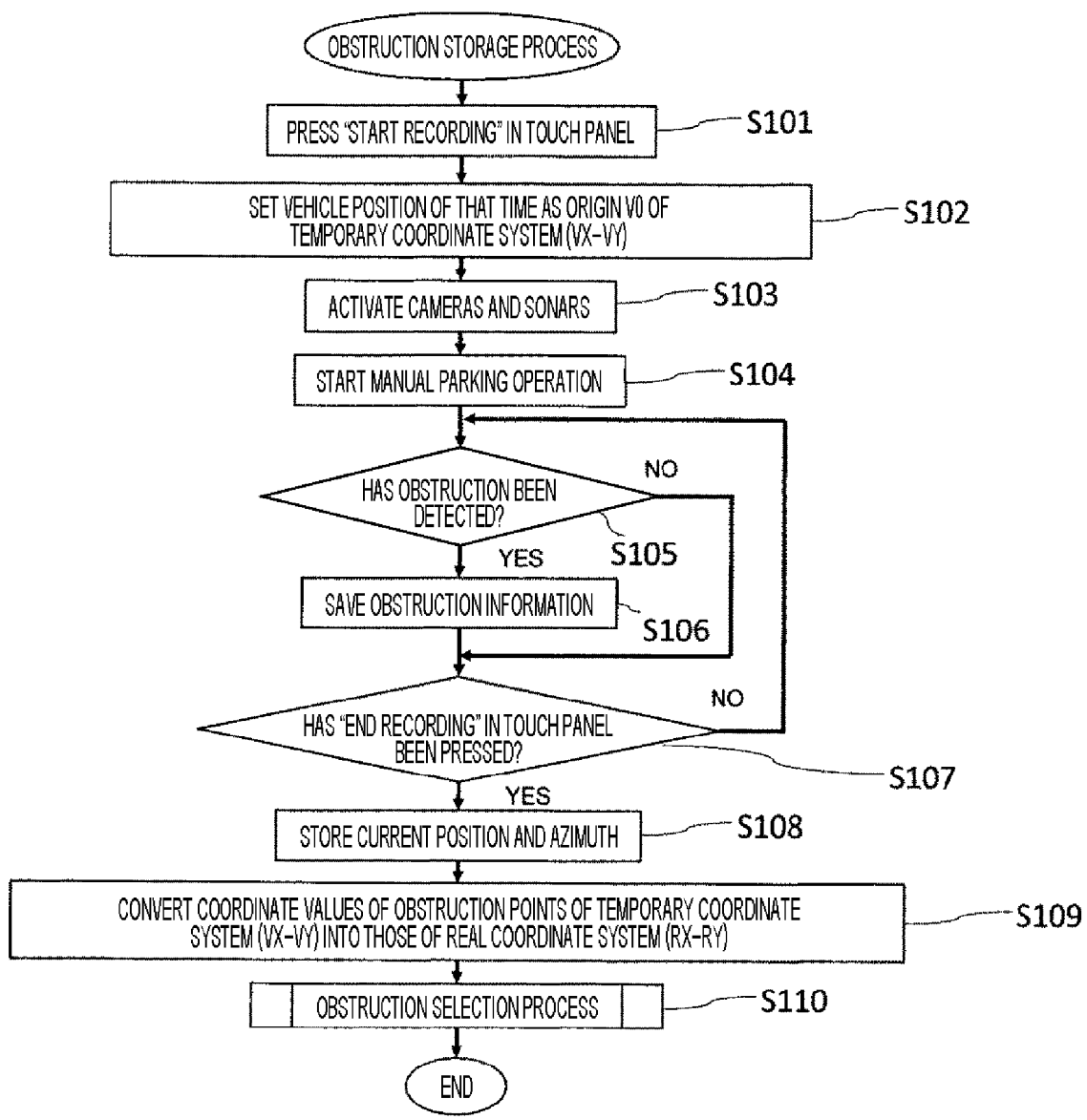
FIG. 7 is a flowchart of an obstruction storage process.

FIG. 7 is a flowchart of the obstruction storage process in the embodiment of the present invention.

In FIG. 7, in step S101, the display screen of the display device 13 displays a button "start recording". Then, when a user presses the "start recording" button, the process proceeds to step S102.

In step S102, as shown in FIG. 4, a current position of the own vehicle 30 when the user touches "start recording" is set as an origin VO of a temporary coordinate system (VX-VY) set on the own vehicle 30. An azimuth of the VX axis (center line in a front-rear direction of the own vehicle 30) matches an azimuth in front of the own vehicle 30, and the VY axis (center line in a width direction of the vehicle) is orthogonal to the VX axis.

In step S103, the sonars 11A to 11L and the cameras 20a to 20d is activated.

Next, in step S104, the user is prompted to start driving operation (parking operation), and manually performs parking operation.

In the example shown in FIG. 4, the user first moves the own vehicle 30 forward as indicated by the arrow, and then performs operation to park the own vehicle 30 in a target parking frame PAf at the parking position PA while moving the own vehicle 30 backward.

In step S105 in FIG. 7, it is determined whether the sonars 11A to 11L and the cameras 20a to 20d have detected an obstruction before the own vehicle 30 parks at the parking position PA. If an affirmative determination is made in this step S105, that is, if an obstruction has been detected, the process proceeds to step S106.

If a negative determination is made in step S105, that is, if no obstruction has been detected, the process moves to step S107.

In step S106, based on the current position of the own vehicle 30, a mounting position of the sonar 11A to 11L that has detected the obstruction, and a distance to the obstruction, a coordinate value of an obstruction point and a coordinate value of a license plate recognized by the camera 12 in the temporary coordinate system (VX-VY) are calculated and stored.

In step S107, it is determined whether an "end recording" button displayed on the display screen of the display device 13 has been pressed.

If an affirmative determination is made in step S107, that is, if the "end recording" button has been pressed, it is assumed that the own vehicle 30 has parked at the parking position PA, and the process proceeds to step S108. If a negative determination is made in step S107, that is, if the "end recording" button has not been pressed, it is assumed that the own vehicle 30 has not reached the parking position PA, and the process moves to step S105, where the above-described processing is repeated. That is, whether the own vehicle 30 has reached the parking position PA and parked is determined by whether the user has touched the "end recording" button.

In step S108, an absolute position (latitude and longitude) of the own vehicle 30 parked at the parking position PA and an absolute azimuth of the own vehicle 30 are stored in a memory 22a of the parking assistance ECU 22.

In step S109, the coordinate values of the obstruction points (the vehicles 40 and 50, and the wall 60) stored as coordinate values of the temporary coordinate system (VX-VY) are converted into coordinate values of a real coordinate system (RX-RY) where, as shown in FIG. 5 in step S108, the absolute value stored in the obstruction storage unit 22a is used as an origin RO, the stored absolute azimuth of the own vehicle 30 is used as an azimuth of an RX axis, and an RY axis is orthogonal to the RX axis. The origin VO of the temporary coordinate system (VX-VY) is also converted into a coordinate value of the real coordinate system (RX-RY).

Figure 8:
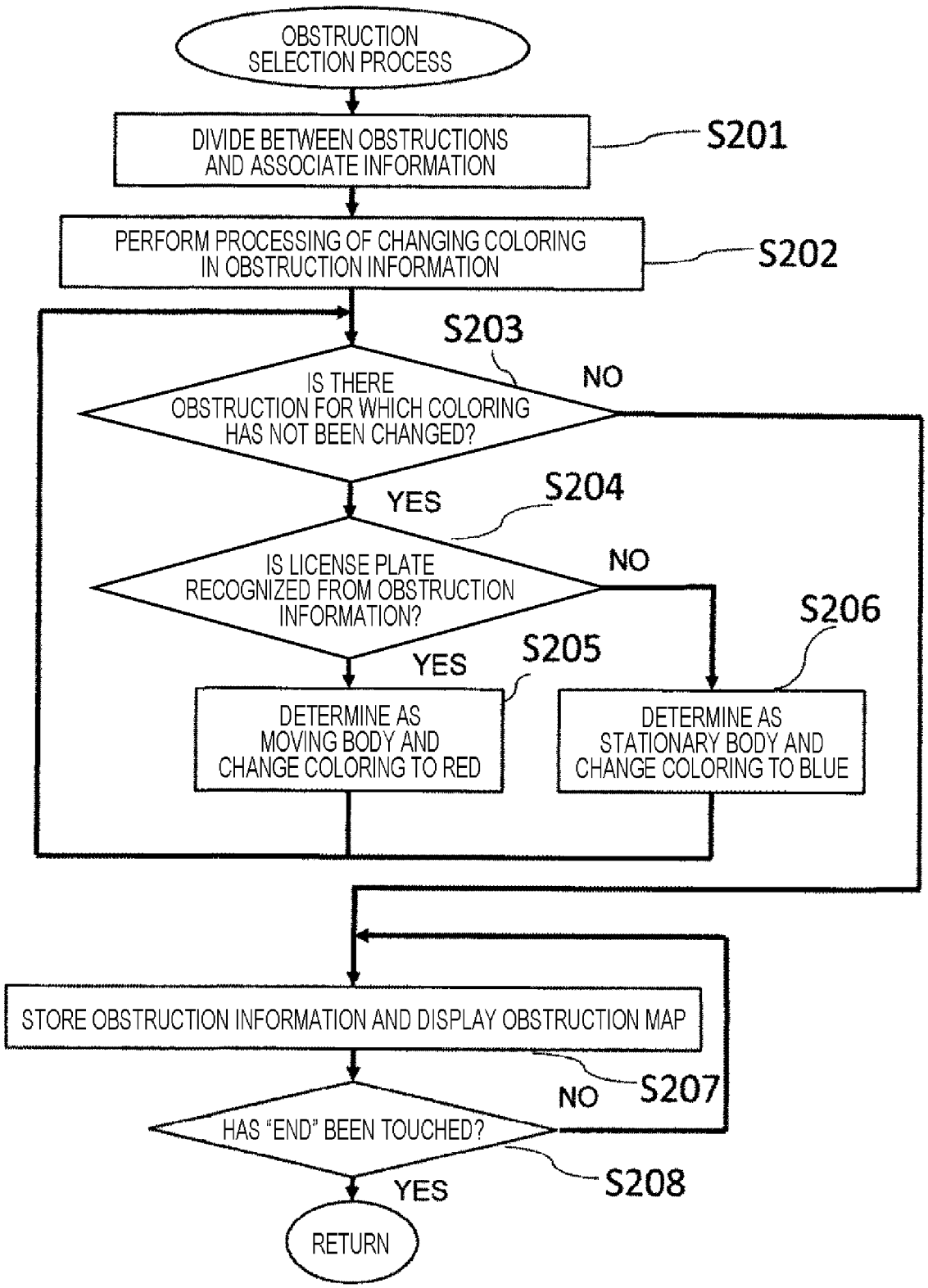
FIG. 8 is a flowchart of the obstruction selection process.

In step S110, the obstruction selection process shown in FIG. 8 is executed.

In step S201 in FIG. 8, the obstruction points converted into the coordinate values of the real coordinate system (RX-RY) are grouped based on continuity of the obstruction points so as to be divided between obstructions. As a result, the coordinate values of each group of the obstruction points of the real coordinate system (RX-RY) are decided. Further, processing is performed to associate the information for each of the obstructions detected by the sonars 11 and the cameras 12 by a positional relationship between the obstructions between which the obstruction points are divided based on the continuity of the obstruction points and the obstructions of which license plates are recognized.

In step S202, the process proceeds to processing of changing coloring of a moving body and a stationary body for each of the obstructions to be displayed on the display device 13 based on the obstruction information.

In step 203, it is determined whether there is an obstruction for which the coloring has not been changed. If an affirmative determination is made in this step S203, that is, if there is an obstruction for which the coloring has not been changed, the process proceeds to step S204. If a negative determination is made in step S203, that is, if there is no obstruction for which the coloring has not been changed, the process moves to step S207.

In step S204, it is determined whether there is license plate information from the information on the selected obstruction for which the affirmative determination is made in step 203. That is, the obstruction type determination unit 22b determines that the obstruction of which license plate has been recognized from the obstruction information is a moving body, and the other obstruction of which license plate has not been recognized is a stationary body (determines the types of the obstructions).

If an affirmative determination is made in this step S204, the process proceeds to step S205, and if a negative determination is made, the process moves to step S206.

In step S205, the obstruction type determination unit 22b changes the coloring in the information on the obstruction determined as a moving body in step 204. That is, an identification indication for identifying a moving body is selected.

In the present embodiment, the coloring of a moving body is changed to red. However, an indication method is not limited thereto and it is sufficient to indicate to the user that the obstruction is a moving body. Any indication method may be used, for example, such as a method of displaying a moving body in a color other than red or a method of displaying a moving body with a thick solid line as shown in FIG. 6. After the processing in this step S205 ends, the process moves to the processing in step 203.

In step S206, the coloring in the information on the obstruction determined as a stationary body in step 204 is changed. In the present embodiment, the coloring of a stationary body is changed to blue that is selected as an identification indication for identifying a stationary body. However, an indication method is not limited thereto and it is sufficient to indicate to the user that an obstruction is a stationary body.

Any indication method for separating between a moving body and a stationary body may be used, for example, such as a method of displaying a stationary body in a color other than blue or a method of enabling identification by an indication with diagonal lines or a pattern as in the obstruction information map shown in FIG. 6.

That is, the identification indication for a moving body and the identification indication for a stationary body can be set differently from each other so that a moving body and a stationary body are identified separately from each other. After the processing in this step S206 ends, the process moves to the processing in step 203.

In step S207, the information on the obstructions having been distinguished (identified) between a stationary body and a moving object is stored in the obstruction storage unit 22a that is the non-volatile memory. The obstruction screen display unit 22c displays an obstruction map showing the identification indications selected by the obstruction type determination unit 22b as shown in FIG. 6 on the display screen of the display device 13.

That is, the obstruction screen display unit 22c displays the obstruction information map indicating the positions of the obstructions on the display device 13 based on the obstruction information stored in the obstruction storage unit 22a.

Then, an expression as a message to the user such as "obstruction stored" is displayed on the display device 13 to notify the user that the distinction of the obstructions types has been completed.

In step S208, it is determined whether the "end" button in the display screen shown in FIG. 6 has been pressed. If an affirmative determination is made in this step S208, this process ends, and if a negative determination is made, the process moves to step S207.

Through the obstruction selection process shown in FIG. 8, types of the obstructions detected by the sonars 11A to 11L and the cameras 12a to 12d are thus automatically distinguished between an irremovable stationary body and a movable moving body, which allows the obstruction storage unit 22a that is the non-volatile memory to store the types of the obstructions as the obstruction information. That is, a stationary body and a moving body can be distinguished to be stored.

Through the obstruction storage process described above, the non-volatile memory is to store the information on the obstructions classified by types (the obstruction information including the types, shapes and sizes, and the coordinate values of the obstructions), and the respective coordinate values of the origin RO and the azimuth of the RX axis of the real coordinate system (RX-RY) and the origin VO of the temporary coordinate system (VX-VY).

Here, when the cameras 12a to 12d perform storage processing of obstructions, the obstruction type determination unit 22b of the parking assistance ECU 22 may determine whether there is an adhering substance such as dirt on a lens of the camera 12a to 12d in a section from start to end of the storage into the obstruction storage unit 22a. If it is determined that there is an adhering substance such as dirt on an imaging portion such as the lens and the image sensor, the obstruction type determination unit 22b may determine that a license plate and a surrounding obstruction are undetectable and prohibit generation of an obstruction map (prohibition of the obstruction storage process).

Whether there is an adhering substance such as dirt on the imaging portion can be determined by whether a certain image is present in a plurality of captured images.

When the sonars 11A to 11L perform storage processing of obstructions, the obstruction type determination unit 22b of the parking assistance ECU 22b may determine whether there is a shielding object around the sonar 11A to 11L in a section from start to end of the storage into the obstruction storage unit 22a. If it is determined that there is a shielding object, the obstruction type determination unit 22b may determine that a surrounding obstruction is undetectable and prohibit generation of an obstruction map (prohibition of the obstruction storage process).

When the obstruction storage process is stopped, an expression indicating that the obstruction storage process is prohibited, such as "obstruction storage process prohibited", may be displayed on the display device 13.

Whether there is a shielding object around the sonar 11A to 11L can be determined by whether any of the sonars 11A to 11L always shows a constant numerical value.

The above-described determination as to whether there is dirt or the like on the lens and whether there is a shielding object around the sonar 11A to 11L may be executed following step S103 in FIG. 7. If there is no dirt or the like on the lens and no shielding object around the sonar 11A to 11L, the process may proceed to step S105. If there is dirt or the like on the lens or a shielding object around the sonar 11A to 11L, the obstruction storage process is prohibited.

Note that both of the determinations of presence or absence of dirt on the lens and presence or absence of a shielding object around the sonar may be executed together, or one of the determinations of presence or absence of dirt on the lens and presence or absence of a shielding object around the sonar may be executed alone.

According to the embodiment of the present invention described above, it is possible to realize the vehicle control apparatus that can automatically distinguish between a moving body and a stationary body that are defined as types of obstructions existing around the own vehicle, reduce user's operation process, and reduce burdens to shorten time for a parking process.

Although the preferred embodiment of the present invention has been described, the present invention is not limited to the above-described embodiment, and various modifications may be implemented without departing from the scope of the present invention.

For example, in the obstruction selection process of the present embodiment, the obstruction type is distinguished by presence or absence of a license plate recognized by the cameras, but the process may be changed such that, when a tire is recognized, the obstruction type is determined as a moving body.

In the obstruction selection process of the present embodiment, the obstruction type is distinguished by presence or absence of a license plate recognized by the cameras, but a motorcycle or the like, since equipped with a license plate only at a rear, would fail to be distinguished as a moving body only by sensing from a front and be stored as a stationary body.

Thus, processing may be added in which a user (operator) uses the display device 13 to select an obstruction whose information is to be arbitrarily changed and change the information from a stationary body to a moving body or from a moving body to a stationary body. Then, in response to the change instruction by the user, the obstruction type determination unit 22b may perform processing of changing the identification indication to a stationary body or a moving body, and cause, via the obstruction screen display unit 22c, the display device 13 to display the changed identification indication on the display screen. This makes it possible to deal with a moving body such as a motorcycle having a license plate only at a rear and a bicycle having no license plate.

REFERENCE SIGNS LIST 11A to 11K sonar
12a to 12d camera
13 display device
14 speaker 15 navigation device
16 wheel speed sensor
17 steering angle sensor
18 accelerator pedal
19 brake pedal
20 shift lever
21 steering wheel
22 parking assistance ECU (parking assistance unit)
22a obstruction storage unit
22b obstruction type determination unit
22c obstruction screen display unit
30 own vehicle
40, 50 adjacent vehicle
60 wall
PA parking position
PAf target parking frame

The invention claimed is:

1. A vehicle control apparatus for detecting an obstruction existing around a target parking position of a vehicle, the vehicle control apparatus comprising:
 a memory;
 a display;
 an obstruction detector comprising a camera and a sonar; and
 a processor that is communicatively coupled to the memory, the display, and the obstruction detector,
 wherein the processor is configured to
  store, in the memory, information on an obstruction detected by the obstruction detector,
  determine a type of the obstruction from the information on the obstruction,
  determine that the obstruction is a moving body when the camera recognizes a license plate of the obstruction, and that the obstruction is a stationary body when the camera recognizes no license plate of the obstruction,
   wherein the determination by the processor whether the obstruction is the moving body or the stationary body is changeable by an operator via the display device,
  perform an obstruction storage process comprising
   setting an identification indication for identifying the determined type of the obstruction, and
   storing the identification indication with the information on the obstruction in the memory, and
  display the information on the obstruction and the identification indication on the display.

2. The vehicle control apparatus according to claim 1, wherein
 the sonar is configured to detect an obstruction existing around the vehicle by transmitting a transmission wave toward an environment of the vehicle and receiving a reflected wave of the transmission wave, and the camera is configured to image the information on the obstruction by an image sensor attached around the vehicle.

3. The vehicle control apparatus according to claim 1, wherein
 the processor is further configured to select the identification indication for identifying the moving body and select the identification indication for identifying the stationary body.

4. The vehicle control apparatus according to claim 1, wherein
 the display is configured to display an obstruction information map indicating a position of the obstruction on the display based on the information on the obstruction stored in the memory.

5. The vehicle control apparatus according to claim 3, wherein
 the display is configured to display the identification indication for the moving body and the identification indication for the stationary body selected by the obstruction determination unit on the display.

6. The vehicle control apparatus according to claim 2, wherein
 the processor is further configured to determine whether there is an adhering substance on an imaging portion of the camera and, when a determination is made that there is an adhering substance on the imaging portion of the camera, prohibit the obstruction storage process.

7. The vehicle control apparatus according to claim 2, wherein
 the processor is further configured to determine whether there is a shielding object around the sonar and, when a determination is made that there is a shielding object around the sonar, prohibit the obstruction storage process.

* * * * *